Figure 1:
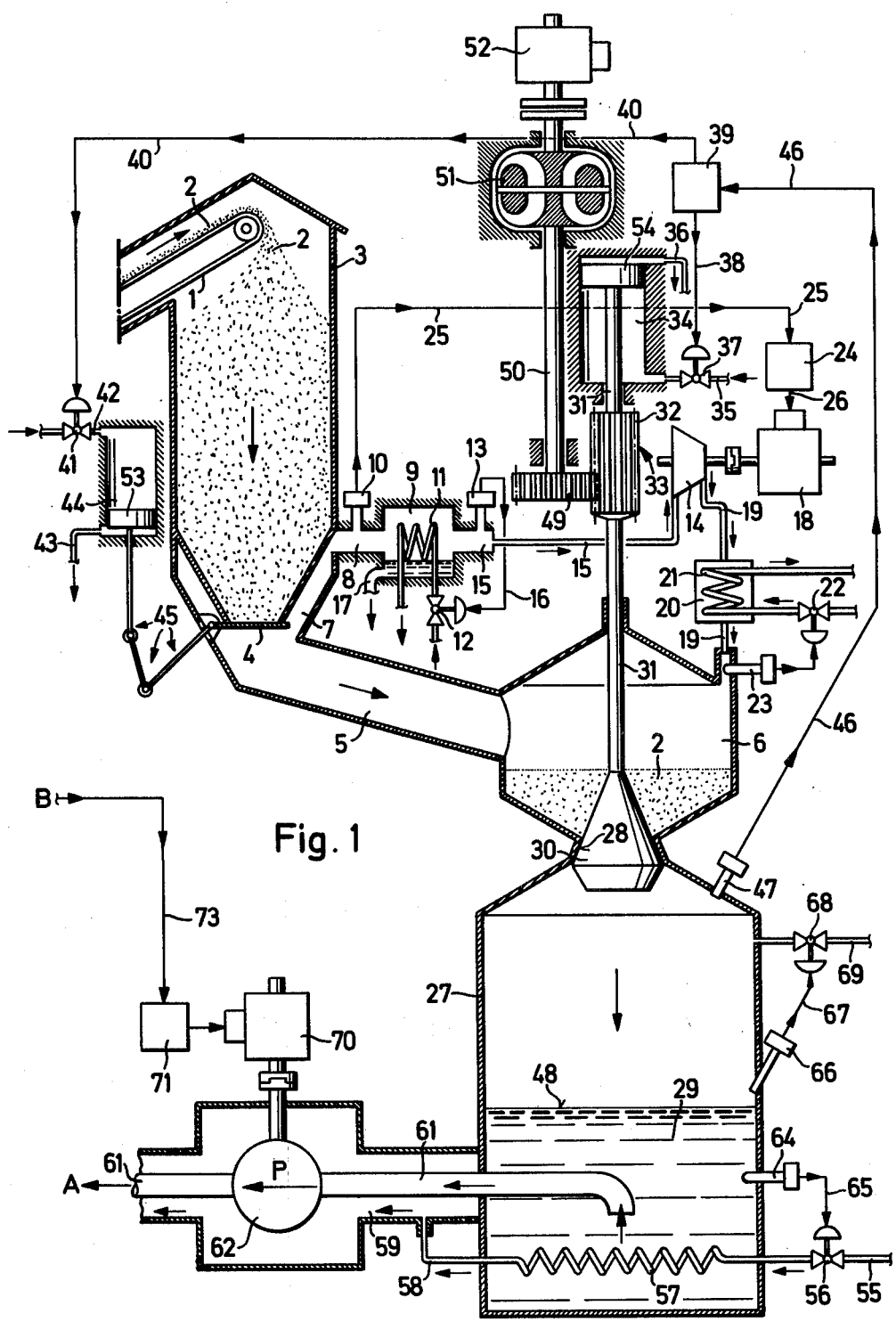

United States Patent [19]

Steiger

[11] 4,077,367
[45] Mar. 7, 1978

[54] METHOD AND APPARATUS FOR OPERATING AN INTERNAL COMBUSTION ENGINE WITH SOLID FUEL

[75] Inventor: Anton Steiger, Winterthur, Switzerland

[73] Assignee: Sulzer Brothers Limited, Winterthur, Switzerland

[21] Appl. No.: 715,500

[22] Filed: Aug. 18, 1976

[30] Foreign Application Priority Data

Jun. 11, 1976 Switzerland ............... 7390/76

[51] Int. Cl.² ..................................... F02B 19/04
[52] U.S. Cl. ..................... 123/23; 123/136; 60/39.46 S
[58] Field of Search ............ 123/3, 23, 24, 136; 60/39.12, 39.46 S

[56] References Cited

U.S. PATENT DOCUMENTS

| | | | |
|---|---|---|---|
| 1,580,656 | 4/1926 | Coninck | 60/39.46 S |
| 1,781,485 | 11/1930 | Wahl et al. | 123/23 |
| 2,420,325 | 5/1947 | Nettel | 123/3 |
| 3,804,606 | 4/1974 | Archer et al. | 60/39.12 |
| 3,965,870 | 6/1976 | Clark | 123/23 |

Primary Examiner—Charles J. Myhre
Assistant Examiner—Craig R. Feinberg
Attorney, Agent, or Firm—Kenyon & Kenyon, Reilly, Carr & Chapin

[57] ABSTRACT

The solid particulate fuel is first dried and then liquified to a viscous state at 300° C within an inert atmosphere in a melting tank. Thereafter, while the heat is retained in the fuel, the liquified fuel is pumped to a heater and heated to a higher temperature of 400° C. This hot fuel is then delivered via switching means to the cylinders of the internal combustion engine while the temperature of the fuel is maintained.

23 Claims, 3 Drawing Figures

Fig. 1

METHOD AND APPARATUS FOR OPERATING AN INTERNAL COMBUSTION ENGINE WITH SOLID FUEL

This invention relates to a method and apparatus for operating an internal combustion engine with solid fuel.

As is known, internal combustion engines have been fueled by various types of gaseous and liquid fuels. However, such engines have generally not been fueled by fuels which are normally solid in an ambient state, at least not economically.

Accordingly, it is an object of the invention to use solid particulate fuel for operating an internal combustion engine.

It is another object of the invention to supply a normally solid fuel to an internal combustion engine.

It is another object of the invention to provide an economical and simple means of operating an internal combustion engine with solid fuel.

Briefly, the invention provides a method and apparatus for operating an internal combustion engine with a solid fuel, and particularly a solid particulate fuel such as a so-called "solvent-refined coal". As is well known, a "solvent-refined coal" is understood to be coal that has been freed of undesired impurities, particularly ash and sulfur, by means of solvents and has been subsequently resolidified.

The method comprises the steps of intermittently feeding batches of the solid fuel particles to a first process station and supplying a hot dry gas to the first process station to dry the fuel particles. Thereafter, the dried fuel particles are fed to a second process station and heated to an elevated intermediate temperature in order to be liquified into a highly viscous pumpable liquid while being maintained in a gaseous atmosphere which is chemically inert to the fuel and at a pressure which corresponds at least approximately to the pressure of the first process stage. Next, the fuel is delivered to a third process station and heated at an elevated pressure to a final temperature, which is higher than the intermediate temperature. Thereafter, the hot liquified fuel is delivered from the third process station at the higher temperature to the fuel receiving cylinders of the internal combustion engine, e.g. via injection pumps and nozzles.

The reason for the three-stage process is that different requirements must be met for the pressure, the temperatures and the gas atmosphere, which must be maintained in and over the fuel during conversion of the fuel into an injectable liquid. Thus, during the final heating, which is primarily to lower the viscosity, it is necessary, for instance, to maintain an elevated pressure in and over the fuel in order to minimize the amount which evaporates from the hot liquid. Furthermore, while no overpressure is necessary for the melting of the particles or lumps of fuel, a protective gas atmosphere, primarily exclusive of air, is required to prevent premature oxidation of the fuel. Finally, drying of the fuel particles can be accomplished without special measures as to the prevailing atmosphere. Thus, the cost is substantially reduced if the drying operation is carried out in a separate process stage rather than in a single stage together with the melting operation.

The apparatus of the invention comprises a storage bin for solid particulate fuel, a dosing means for discharging batches of fuel particles from the bin, a reaction vessel to receive the batches of fuel particles and a means connected to the reaction vessel to maintain a dry hot gas atmosphere in the reaction vessel. In addition, the apparatus includes a melting tank to receive dried fuel particles from the reaction vessel, a control means between the reaction vessel and melting tank to control the amount of fuel particles delivered from the reaction vessel to the melting tank, a heating means for heating the fuel particles in the melting tank, and means to supply inert gas into the melting tank. Also, the apparatus includes a pump connected to the melting tank to pump liquified fuel therefrom under pressure, a heater connected to the pump to receive the pumped fuel and a second heating means for heating the fuel in the heater. Further, the apparatus includes a conveying means connected to the heater to deliver the hot fuel from the heater to the cylinders of the internal combustion engine.

The conveying means also includes a return line for the return of unused fuel from the combustion engine to the heater for reheating.

The method of the invention can advantageously be carried out in such a manner that the lumps or particles of fuel are initially fed continuously to a storage bin and then fed in batches to the first process station wherein suitable control means can control the cycle frequency of the individual intermittent feeding operations. These intermittent operations can be performed at constant cycle length for the single feeding operation as a function of suitable operating parameters of the process, as will be discussed further on. The batchwise operation of the first and particularly the second process stage is especially advantageous since this results in only low losses of the chemically inert gas atmosphere from the melting tank of the second stage.

An advantageous solution - energy wise - for implementing the first process stage is obtained if the drying of the fuel particles is carried out by means of a gas stream which conducted in a closed loop, and particularly if an air stream of atmospheric pressure is used. For this purpose, a closed loop may be provided for the drying gas which comprises at least a condenser, a pump or the like, a heater and the reaction vessel. In order to control the first process stage, suitable control means may be provided which cooperate with the cycle control means mentioned above and which will be described later on.

Particularly low losses of inert gas are obtained in the first stage, if air of about 100° C is used as the gas in the first process stage and if carbon dioxide serves as the inert gas in the second process stage while a temperature of about 300° C is maintained in the second process stage. At this latter temperature, the specific gravities of the gas atmosphere in the first and the second stations are approximately equal, so that the gas exchange between the two stations takes place only by diffusion without additional gravity effects. In this connection, it is, of course, also possible to reduce this gas exchange, if the reaction vessel and melting tank are arranged on top of each other and use is made of a gas which is heavier under the conditions prevailing during operation in the melting tank.

In order to avoid heat losses and, thereby, increases in the viscosity on the way from the second to the third process station, it is advantageous if the heating and liquification of the fuel in the second process station is accomplished by a first heating medium which is also used to maintain the fuel at the desired temperature during travel to the third process station.

In a similar manner, viscosity increases of the liquid fuel, which is at its final temperature, which could have an adverse effect on injectability, can be avoided. To this end, a second heating medium is used not only to heat the fuel at the elevated pressure but also to maintain the fuel at the same temperature while being fed to the internal-combustion engine. In either case, the heating means can consist of heat exchangers through which a heating medium flows, for instance, a synthetic oil. Furthermore, the pump and an associated pump line between the melting tank and the heater can be enclosed by a first thermostatic jacket through which one of the heating media flows while the conveying means for the fuel between the heater and the injection pumps of the internal combustion engine is enclosed by a second thermostatic jacket through which the heating medium of the heater flows. In this manner, the heating media can also serve as the flow media in the jackets which maintain the temperature constant.

Where the control means uses a valve body to open and close a passage for the flow of fuel to the melting tank, the solid fuel particles can be prevented from adhering and baking-on in the passage and on the valve body by rotating the valve body during opening and closing. To this end, the control means includes a means for rotating the valve body about its longitudinal axis which means is equipped with a slip clutch or an over-torque shut-off. Thus, during opening and closing, particles sticking to the valve body are flung off by the centrifugal force of the rotation and the mating surfaces of the valve body and passage are ground-in anew by the rotation of the valve body during each closing operation. In this connection, the slip clutch or the over-torque shut-off allows the rotation to be interrupted if the passage is closed, so that the drive means for the control means is not overloaded.

To facilitate servicing of the injection system when the internal-combustion engine is shut-off and shut-down, provision is made for a flushing fuel loop in a known manner. The loop includes a closed piping loop equipped with a pump or other pressurizer which can be selectively connected via switching means to the piping system through which the liquid fuel is delivered to the engine. In addition, the switching means simultaneously cause the drive for the pump of the flushing fuel to be switched on and off.

Still further, a degassing means for the returned portions of the fuel may be provided in the heater for the fuel as well as in the piping loop for the flushing fuel.

Furthermore, a simple control of the pressure of the low-viscosity fuel liquid in the heater can be accomplished which is automatically adapted to the amount of fuel demanded by the internal-combustion engine at any one time. To this end, a pressure diaphragm is mounted within the heater and held at equilibrium by the fuel in the heater on one side and by a regulating compressed-gas cushion on the other side. The pressure of the compressed-gas cushion is also used to control the switching on and off of the pump located between the melting tank and the heater. The pressure diaphragm may be held practically in a null position by an automatic control valve. Also, the level of the low-viscosity liquid fuel can be controlled in the heater via a level control means which vents fuel vapor to the outside. These process fuel losses can be avoided if, at the third process station, fuel vapor is fed to the intake air of the internal-combustion engine.

Figure 2:
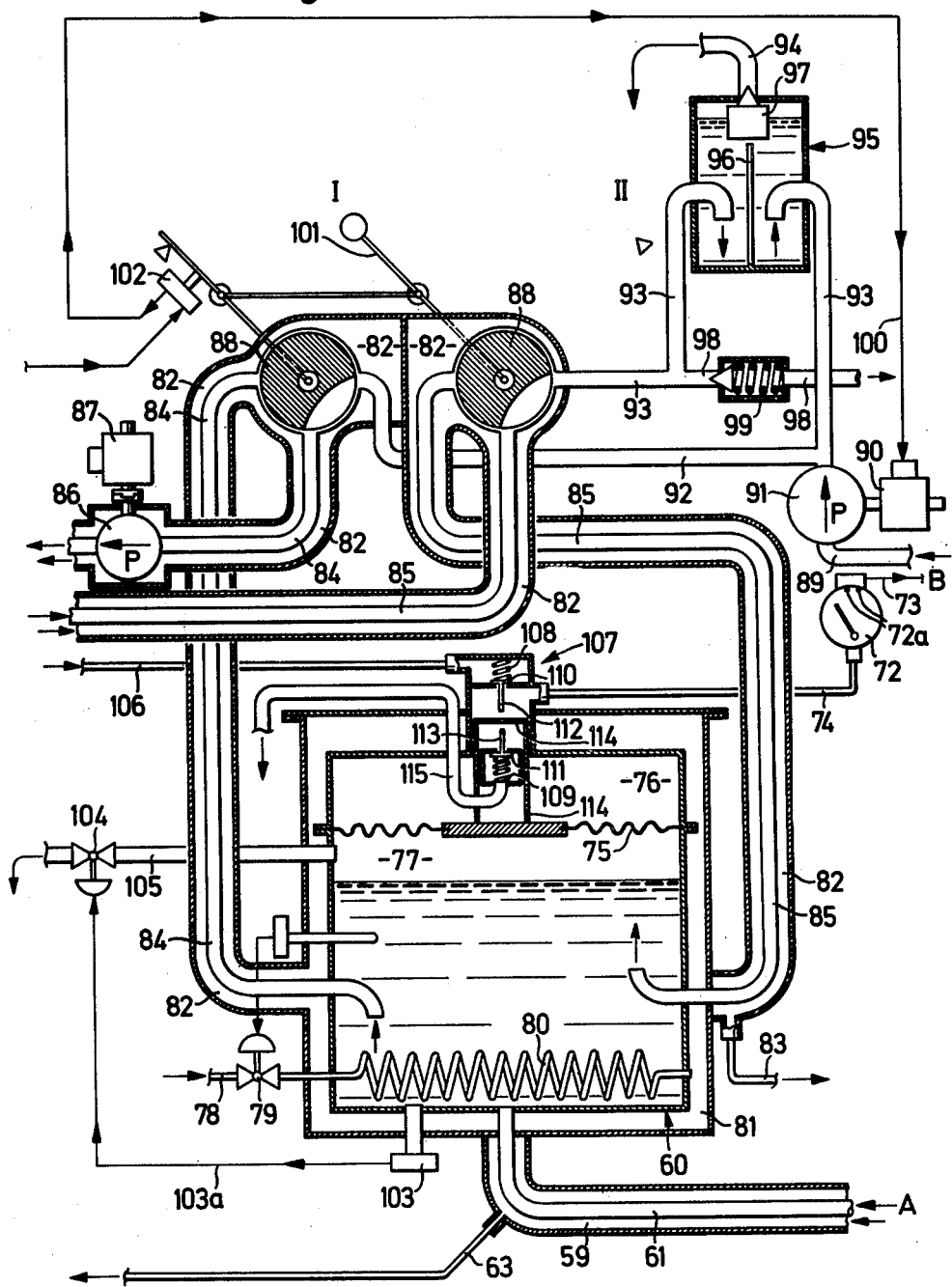
Figure 3:
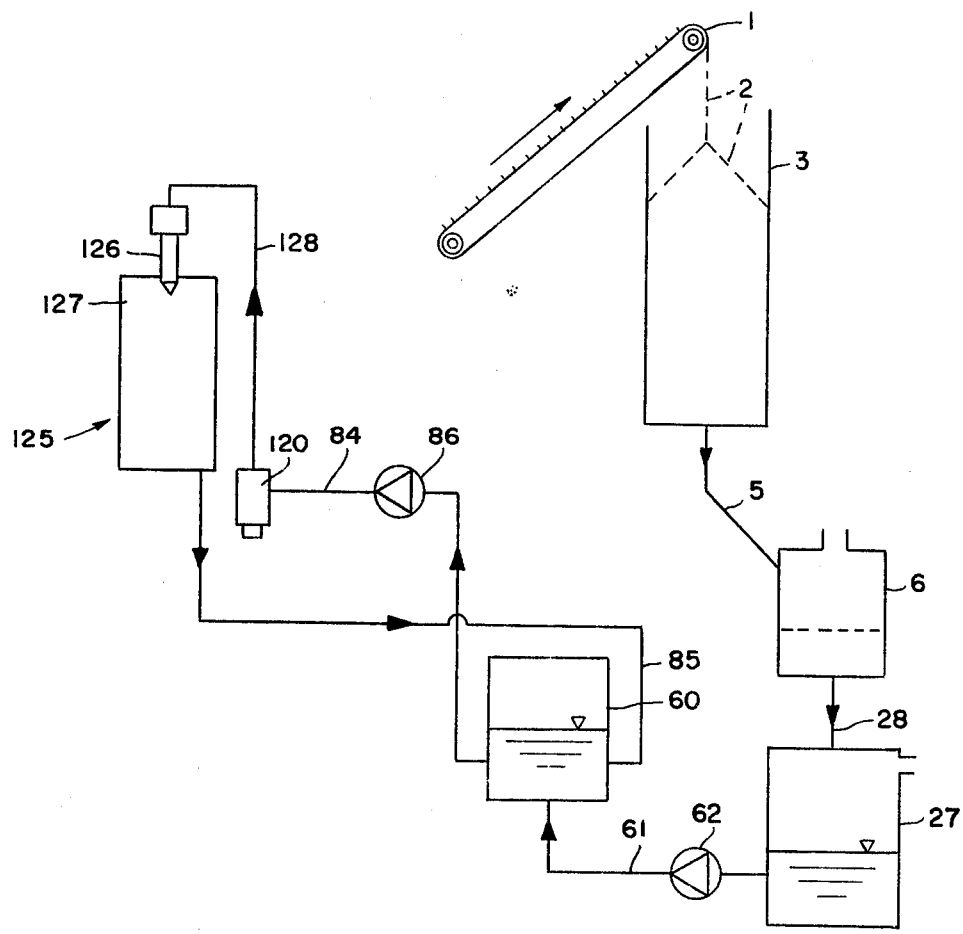

These and other objects and advantages of the invention will become more apparent from the following detailed description and appended claims taken in conjunction with the accompanying drawings in which:

FIG. 1 schematically illustrates an apparatus according to the invention for implementing the first two process stages of the invention FIG. 2 schematically illustrates an apparatus according to the invention for implementing the third process stage of the invention; and FIG. 3 schematically illustrates the apparatus of the invention with an engine.

The transitions from FIG. 1 to FIG. 2 are deisngated in both figures with A—A and B—B, respectively.

Referring to FIG. 1, the apparatus includes a conveyor belt 1 which continuously transports solid, lumpy, particulate fuel 2 into a storage tank or bin 3 having a funnel-shaped bottom which is closed off by a closing means in the form of a shutter or flap 4. The bin 3 is in communication with a reaction vessel 6 via a transport chute 5. The vessel 6, which is arranged on top of a second reaction vessel or melting tank 27, serves as a reactor for the drying of the particulate fuel and constitutes a first station in the process.

The vessel 6 is part of a closed loop for a gas stream which starts from the vessel 6 and leads via the chute 5 into a chamber 7 of the bin 3 which accommodates the flap 4 and, via a pipe section 8, past a first moisture measuring device 10, first into a condenser 9 and then through a pump, such as a blower 14 to a heater 20 before returning to the reaction vessel 6. The condenser 9 serves to de-humidify the moist gas which enters via cooling. To this end, the condenser 9 has a coil 11 through which a coolant flows and in which the coolant flow rate is controlled by a control valve 12. The control valve 12 receives positioning pulses via a signal line 16 from a second humidity measuring device 13, which is provided in a pipe section 15 downstream of the condenser 9 which leads to a blower 14. The condensate is discharged from the condenser 9 via an outlet 17 indicated only schematically.

From the blower 14, which is driven by a motor 18 and provides the maintenance of the gas flow in the closed loop, a line 19 in which the heater 20 is arranged leads back into the vessel 6. The gas heater 20 is supplied via a coil 21 from a heat source (not shown) with a heating medium, the flow of which through the coil 21 is controlled by means of a control valve 22 as a function of the temperature of the gas entering the reaction vessel 6 as measured by a sensor 23. As already mentioned, the pieces of fuel are advantageously dried with air of atmospheric pressure and with a temperature of about 100° C.

The signals coming from the first moisture measuring device 10 arrive via a signal line 25 at a control unit 24, which gives on or off signals to the blower motor 18 via a line 26 if the moisture measured by the sensor 10 exceeds or falls below certain limits.

A control means is positioned between the reaction vessel 6 and the melting tank 27 to control the amount of fuel particles delivered from the vessel 6 to the tank 27. This control means includes a passage 28 between the vessel 6 and tank 27 through which the dried pieces of fuel 2 can fall by gravity to the melting tank 27 and a valve body 30 for selectively opening and closing the passage 28. The valve body 30 is connected via a spindle 31 to a servomotor 34 which has lines 35, 36 through which pressure medium can flow in and out. As shown, a controllable shut-off valve 37 is provided for the lines 35, 36 which is controlled via a signal line 38 by a second control unit 39. The control unit 39 gives a second output signal via a second signal line 40 to a likewise controllable shut-off valve 41 of the closing means in a pressure medium line 42 of a second servomotor 44, which is provided with a pressure relief line 43. This servomotor 44 is connected via a lever 45 to the flap 4 and serves to cyclically open and close the flap 4.

The control unit 39 is programmed, for instance, so that the valve body 30 opens with a delay after opening of the flap 4. Also, the control unit 39 is programmed so that the cycle lengths for the opening of the flap 4 and valve body 30 are of fixed duration in order to allow drying of the batch of fuel particles fed to the vessel 6 via the flap 4 while the cycle frequency is determined by a measurement signal which is fed to the unit 39 via a signal line 46 sent out by a level-measuring device 47, e.g. a level meter which operates ultrasonically to measure the height of the level 48 of the melt 29 in the tank 27.

The sequence of the operations controlled by the unit 39 is, for instance, such that, if the level 48 drops below a fixed value, the unit 39 first gives a positioning pulse to the shut-off valve 41 so that the valve 41 is opened. The pressure medium above the piston 53 of the servomotor 44, which is shown in the rest or closed position of the flap 4, is then led away through the line 42. The weight of the fuel loading the flap 4 then opens the flap 4 for a predetermined fixed time interval, whereby the piston 53 of the servomotor 44 is moved into its upper end position. With the flap 4 open, a definite batch of fuel falls into the vessel 6 through the chute 5. At the end of the time interval, further positioning signals sent by the unit 39 via the line 40 cause pressure medium to be admitted again to the upper side of the piston 53; the piston 53 moves downward and the flap 4 is closed.

After a further predetermined, but optionally variable time interval, during which the batch of particulate fuel 2 contained in the vessel 6 is dried, the control unit 39 causes the valve 37 to be opened via the line 38. The underside of the piston 54 of the servomotor 34 also shown in the rest or closed position of the shut-off valve 30 is thus relieved. Due to the weight of the piston 54 and valve body as well as the weight of the fuel resting thereon, the valve body 30 opens for a likewise predetermined time interval, whereby the batch of dried fuel 2 falls into the melting tank 27.

The control means also includes a means for rotating the valve body 30 during opening and closing of the passage 28. This latter means includes a pinion 33 on the spindle 31 which has teeth 32 to mesh with a gear 49, which is driven, via a shaft 50 and a slip clutch 51, by an electric motor 52 which runs continuously while the internal combustion engine is in operation. The transmission torque of the slip clutch 51 is set so as to impart a rotary motion to the gear 49 and thereby, to the shut-off valve body 30 via the pinion 33 only if the valve body 30 is in an open position. If the valve body 30 is closed, the friction forces occurring between the valve body 30 and the seating surface of the passage 28 are so large that the secondary part of the slip clutch 51 stands still. Thus, the closed valve body 30 executes no rotation in the closed position. This described manner of transmitting the torque by means of slip, however, can be replaced by an overtorque shut-off device which reacts to overcurrents of the motor 52. The rotation imparted to the valve body 30 during opening and closing allows cleaning of fuel particles adhering to the valve body 30 during every stroke so that tight closing is always assured. As already mentioned, the cleansing action consists, first, of flinging the particles off due to centrifugal force and, second, of grinding the valve body 30 to fit its seat in the passage 28. For this latter purpose, both surfaces which rub on each other can be covered with hard low-abrasion material.

The energy for melting down and heating the fuel to about 300° C is supplied to the tank 27 via a heating means which uses a heating medium, e.g. a synthetic high-temperature oil, which flows from a heat source (not shown). This heating means includes a line 55 which extends from the heat source via a control valve 56, to heating pipes 57 in the melting tank 27. The heating means also includes a line 58 downstream of the heating tubes 57 which extends out of the melting tank 27 to a thermostatic jacket 59 which surrounds a pump line 61 which connects the tank 27 to a final heater 60 and which has a pressurizer or pump 62 interposed therein. The line 58 serves to deliver the heating medium to the jacket 59 for con-current flow relative to the fuel being pumped in the line 61 to the heater 60. The line 58 has an outlet near the heater 60 which connects to a return line 63 for passing the heating medium back to the heat source (not shown).

The fuel, which is melted down in the tank 27 to form a pumpable liquid of relatively high viscosity, is fed via the connecting line 61 to the final heater 60, the thermostatic jacket 59 serving to prevent heat losses and thereby to prevent the liquid fuel from cooling down along this path, whereby the pumpability of the liquid might be adversely affected or nullified.

The energy supply to the tank 27 is controlled by means of the control valve 56 as a function of the temperature of the melt in the tank 27. In order to measure this temperature, a temperature sensor 64 is provided on the tank 27 and is connected via a signal line 65 to the control valve 56.

As already described, a chemically inert atmosphere, for which carbon dioxide ($CO_2$) is preferably used as the inert gas, is necessary in the tank 27 for melting down the fuel. In order to monitor the atmosphere, a gas sensor 66, which measures either the $CO_2$ content or the oxygen content of the atmosphere in the tank 27 is provided in the tank 27. If the measured valve exceeds or falls below a predetermined setpoint limit, depending on the kind of gas to which the sensor 66 responds, the sensor 66 causes, via a signal line 67, a means, such as a shut-off valve 68 in a line 69 which connects the tank 27 to an inert gas source (not shown) to be opened. The gas source may, for instance, be a compressed-gas source. After the excess over, or the shortfall below, is compensated, the sensor 66 emits a signal to the valve 68 to close the line 69.

The pump 62 serves to increase the pressure of the liquified pumpable fuel for the third process stage, which is necessary for the reasons described. The pump 62 is driven by a motor 70 which is switched on and off via a control unit 71 by a contact manometer 72 (FIG. 2) via the contacts 72a of the manometer 72; the contact manometer 72 being connected to the control unit 71 via a signal connection 73.

The heater 60 constitutes a third station in the process and operates to convert the highly viscous liquid fuel of the second station into an injectable liquid of low viscosity by raising the temperature of the fuel to about 400° C. This heater 60 is in the form of a vessel which has a pressure diaphragm 75 clamped therein to subdivide the heater 60 into a liquid fuel chamber on one side and a gas chamber 76 on the opposite sides of the diaphragm 75. As shown, the pump line 61 connects with the fuel chamber to deliver the heated fuel into the chamber. In addition, a means is provided for heating the fuel in the fuel chamber. This means includes heat exchanger 80 formed of a plurality of pipes in the chamber and a line 78 which connects a suitable source of heating medium (not shown) via a control valve 79 to the heat exchanger 80. The heating medium may be a synthetic high temperature oil.

The heater 60 is completely surrounded by a thermostatic jacket 81 which connects to the heat exchanger 80 so that the heating medium also flows about the heater 60 to maintain the fuel at the temperature to which the fuel is heated in order to avoid degradation of the injectability of the fuel by cooling.

Referring to FIGS. 2 and 3, a conveying means is connected to the heater 60 in order to deliver the hot fuel to the cylinders (not shown) of an internal combustion engine 125. This conveying means includes a supply line 84 which communicates with the heater 60 to receive a flow of hot fuel and a pump 86 which is driven by a motor 87 and interposed in the supply line 84 to pump the hot fuel to each engine cylinder 127, e.g. via an injection pump 120 and injection nozzle 126. Also, a return line 85 is connected to the heater 60 to return unused fuel from the engine 125 for reheating in the heater 60.

Referring to FIG. 3, during operation, liquid fuel is transported by the pump 86 from the heater 60 into a fuel injection pump 120 via the fuel line 84. The injection pump 120, as is known, causes a pressure increase in the fuel which is essential for injection into the cylinder 127 by means of the injection nozzle 126. The pump 120 and nozzle 126 are connected with each other by means of a fuel line 128. The constructional characteristics of the injection pump 120 and injection nozzle 126 are further described in detail in copending U.S. patent application Ser. No. 715,150, filed Aug. 17, 1976.

In order to maintain the hot fuel nearly at the temperature reached in the heater, the supply line 84, pump 86 and return line 85 are encased in a thermostatic jacket 82. This jacket 82 communicates with the jacket 81 about the heater 60 so that the heating medium also passes over the lines 84, 85 and pump 86. A suitable outlet 83 is provided in the jacket 82 about the return line 84 to return the heating medium to the heat source for reheating.

Switching means 88 are also interposed in the supply line 84 and return line 85 to selectively shut off the engine from the hot fuel so that a flushing fuel can be passed into and through the injection pumps and nozzles of the engine from a suitable flushing fuel system. Such a system may be used before the internal combustion engine is shut off to pass a flushing fuel, e.g. gas oil, which has a relatively low viscosity at ambient temperature into the injection system of the engine to flush out the liquid fuel. As shown, the flushing fuel system has a flushing fuel loop which includes a line 89 which connects to a tank for the flushing fuel (not shown), a pump 91 in the line 89 which is driven by a motor 90 to bring the flushing fuel to the pressure prevailing in the heater 60 and the supply line 84, a supply line 92 and a return line 93. The supply line 92 is selectively connected via one switching means 88 to the pump 86 so that the pressurized flushing oil can be pumped into the line 84 which leads to the injection pumps. Like the fuel used during operation, the flushing fuel returns in the lines 85 from the injection pumps and is conducted via the second switching means 88 into the separate return line 93. This return line 93 is also connected via a degassing means 95 to the supply line 92 for the flushing fuel. In this manner, the flow path for the flushing fuel is closed.

The degassing means 95 consists of a tank 95 which is equipped with baffle and deflection plates 96 and has a blowdown line 94 which branches off from a gas space and can be closed against the atmosphere by a float valve 97. In addition, an overpressure relief line 98 in which a relief valve 99 is provided, branches off from the line 93. This relief line 98 returns excess flushing fuel to a tank (not shown) in case the pressure in the return lines 85, 93 exceeds the opening pressure of the relief valve 99.

In order to activate the electric motor 90, a signal line 100 is connected between the motor 90 and a switch 102 which is actuated by a lever system 101 simultaneously with the switching means 88. The energy supply to the motor 90 is completed only if the switching means 88 are in their position I, i.e. if flushing of the line system 84, 85 is necessary. In the operating position II of the switching means 88, in which the injection system of the internal-combustion engine is supplied with fuel from the heater 60, the switch 102 is open, so that the motor 90 and, therefore, the pump 91 do not run during the operation of the internal-combustion engine.

The heater 60 is also provided with a level detector 103 which operates, for instance, ultrasonically, for measuring and controlling the liquid level and, thus, the gas or vapor quantity in the heater 60. The measurement data of this level detector 103 is transmitted via a signal path 103a to a shut-off valve 104 in a line 105 which leads from a vapor space in the fuel chamber 77 of the heater 60 to the intake line of the internal combustion engine. The gaseous or vaporous fuel which is conducted away through this line 105 and which consists predominantly of hydrocarbons is also fed to the cylinders of the internal combustion engine to be burned.

A compressed-gas cushion is maintained in the space 76 so as to be used as a measure of the pressure prevailing in the vapor space 77 of the heater 60 so that the pump 62 can be switched on and off in dependence on this pressure. To this end, the deflection of the diaphragm is practically inhibited, i.e. the diaphragm remains practically in a null position by use of a stroke inhibiting device 107. The pressure in the gas chamber 76 thus serves, via the line 74, as the control variable for the manometer 72 and thereby, for the switching on and off of the pump 62.

The contact manometer 72 (which is shown in the in the position "not operative") is acted upon via the line 74 by the pressure of a compressed-gas cushion in the gas chamber 76. The purpose of the diaphragm 75 is to provide and to ensure pressure-dependent volume elasticity in the vapor space 77 during operating conditions in which the space 77 is completely filled with liquid fuel, for example a certain time after the apparatus has been started. Only through the evaporation of the liquid fuel and the degassing of the excess fuel returning from the injection system of the internal-combustion engine is a vapor and gas-filled volume built up in the space 77. Thus, it is only after some period of time that the state of equilibrium shown in FIG. 2 is reached wherein the liquid level leaves a vapor space 77.

The stroke-limiting device 107 for the diaphragm 75 is interposed in a compressed gas, e.g. air, line 106 and consists of two valves 110, 111 which have opposite opening directions and are spring-loaded by springs 108, 109. The line 74 branches off from the space in between which is continuously in communication with the vapor space 76. The movable valves 110, 111 each carry a plunger 112, 113 on their sides facing away from the springs 108, 109. A bracket 114, which is connected to the diaphragm 75 and is therefore movable, is arranged between the two plungers 112, 113. In operation, the valve 110 releases and blocks the supply of compressed gas from the line 106 into the gas chamber 76. If the diaphragm 75 is deflected because the pressure in the chamber 76 is too low, the bracket 114 abuts against the plunger 112 and the valve 110 opens against the force of the spring 108. If the pressure in the chamber 76 is too high, the diaphragm 75 tries to give way in the downward direction. The bracket 114 then pushes on the valve 111 via the plunger 113, whereby a relief line 115 for the compressed air is released. By blowing off a partial amount of compressed air, the diaphragm 75 is returned, in this case, to its null position, whereby the compressed-gas cushion can serve as a measure and control variable for the pressure in the heater 60 as described above.

What is claimed is:

1. A method for operating an internal combustion engine having fuel receiving cylinders with solid particulate fuel, said method comprising the steps of
    intermittently feeding batches of the solid fuel particles to a first process station;
    supplying a flow of hot dry gas to said first process station to dry the fuel particles in said first process station;
    thereafter feeding the dried fuel particles to a second process station;
    heating the fuel particles in said second process station to an elevated intermediate temperature to liquify the fuel particles into a highly viscous pumpable liquid while maintaining the liquified fuel in a gaseous atmosphere chemically inert to the liquified fuel and at a pressure at least equal to the pressure in said first process stage;
    delivering the liquified fuel from said second process stage to a third process stage;
    heating the liquified fuel in said third process stage at an elevated pressure to a higher temperature than said intermediate temperature; and
    thereafter delivering the hot liquified fuel from said third process station at said higher temperature to the fuel receiving cylinders of the internal combustion engine.

2. A method as set forth in claim 1 which further comprises the step of continuously delivering a flow of solid fuel pieces to a storage bin and wherein said step of intermittently feeding batches of the solid fuel to said first process station includes the discharging of batches of the solid fuel pieces from the storage bin to said first process station.

3. A method as set forth in claim 1 wherein the flow of hot dry gas for drying the fuel particles in said first process station is contained in a closed loop wherein the gas is de-humidified and heated.

4. A method as set forth in claim 1 wherein the gas in said first process station is air at a temperature of 100° C, the gaseous atmosphere in said second process station is carbon dioxide and the temperature in said second process station is 300° C.

5. A method as set forth in claim 1 wherein said step of heating in said second process station includes the passing of a heating medium into heat exchange relation with the fuel and said step of delivering the liquified fuel to said third process station includes the passing of the liquified fuel from said second process station to said third process station and on said passage maintaining nearly its temperature by said heating medium.

6. A method as set forth in claim 1 wherein the fuel in said third process station is heated to a temperature of 400° C.

7. A method as set forth in claim 6 wherein said step of heating in said third process station includes the passing of a heating medium into heat exchange relation with the fuel and said step of delivering the hot fuel from said third process station includes the passing of the hot fuel from said third process station to the cylinders of the internal combustion engine and on said passage maintaining nearly its temperature by said heating medium.

8. A method as set forth in claim 1 which further comprises the step of delivering vaporized fuel from said third process station to the cylinders of the internal combustion engine.

9. An apparatus for operating an internal combustion engine having fuel receiving cylinders with solid particulate fuel, said apparatus comprising
    a storage bin for solid particulate fuel;
    a closing means connected to said bin for discharging batches of fuel particles therefrom;
    a reaction vessel for receiving the batches of fuel particles from said bin;
    first means connected to said reaction vessel for maintaining a dry hot gas atmosphere in said reaction vessel;
    a melting tank for receiving dried fuel particles from said reaction vessel;
    a control means between said reaction vessel and said melting tank to control the amount of fuel particles delivered from said reaction vessel to said melting tank;
    a first heating means for heating the fuel particles in said melting tank;
    means for supplying inert gas into said melting tank;
    a pump connected to said melting tank to pump liquified fuel therefrom under pressure;
    a heater connected to said pump to receive the pumped liquified fuel;
    a second heating means for heating the fuel in said heater; and
    conveying means connected to said heater to deliver the hot fuel from said heater to the cylinders of an internal combustion engine.

10. An apparatus as set forth in claim 10 wherein each said heating means includes at least one heat exchanger having a heating medium flowing therethrough.

11. An apparatus as set forth in claim 10 which further comprises a pump line between said melting tank and said heater and having said pump interposed therein; and a jacket surrounding said pump line and said pump, said jacket being connected to said first heating means to convey the heating medium thereof about said pump line and said pump to maintain the heat of the pumped fuel.

12. An apparatus as set forth in claim 10 which further comprises a thermostatic jacket surrounding said conveying means and connected to said second heating means to convey the heating medium thereof about said conveying means to maintain the heat of the conveyed fuel.

13. An apparatus as set forth in claim 9 wherein said control means includes a passage between said reaction vessel and said melting tank, a valve body for selectively opening and closing said passage, and means for rotating said valve body during opening and closing of said passage.

14. An apparatus as set forth in claim 13 wherein said means for rotating said valve body includes a slip clutch.

15. An apparatus as set forth in claim 9 wherein said first means forms a closed loop with said reaction vessel and includes a condenser for removing moisture from the gas, a pump for pumping the gas through said closed loop and a heater for heating the gas.

16. An apparatus as set forth in claim 9 which further comprises a closed piping loop for a flushing fuel having a pump therein and a switching means for selectively connecting said piping loop and said hot fuel conveying means to the cylinders of the internal combustion engine.

17. An apparatus as set forth in claim 16 wherein said pump of said piping loop has a drive and said switching means is connected to said drive to effect a switching on or off of said drive simultaneously with the connecting in or out of said piping loop to the combustion engine cylinders.

18. An apparatus as set forth in claim 16 wherein said conveying means has a return line for returning unused fuel to said heater from the combustion engine cylinders and which further comprises a de-gassing means connected to said return line.

19. An apparatus as set forth in claim 18 wherein said closed piping loop has a return line and a de-gassing means connected thereto.

20. An apparatus as set forth in claim 9 which further comprises a pressure diaphragm in said heater to define a liquid fuel chamber on one side and a gas chamber on an opposite side; and means connected to said gas chamber to maintain a controlled gas cushion therein.

21. An apparatus as set forth in claim 20 wherein said latter means includes an automatic control valve for maintaining said diaphragm in a null position.

22. An apparatus as set forth in claim 20 which further comprises a level control means for maintaining a constant liquid fuel level in said heater, said level control means including a valve for venting vapor from said liquid fuel chamber of said heater.

23. An apparatus as set forth in claim 20 wherein said latter means is connected to said pump to selectively operate said pump.

* * * * *

UNITED STATES PATENT AND TRADEMARK OFFICE
CERTIFICATE OF CORRECTION

PATENT NO. : 4,077,367

DATED : March 7, 1978

INVENTOR(S) : Anton Steiger

It is certified that error appears in the above-identified patent and that said Letters Patent are hereby corrected as shown below:

Column 4, line 7, after "invintion" insert --;--

Column 5, line 8, after "lever" insert --system--

Column 10, line 56, change "claim 10" to --claim 9--

Signed and Sealed this

Nineteenth Day of September 1978

[SEAL]

Attest:

RUTH C. MASON
*Attesting Officer*

DONALD W. BANNER
*Commissioner of Patents and Trademarks*